United States Patent [11] 3,620,812

| | | |
|---|---|---|
| [72] | Inventors | David Leonard Boutle;<br>Margaret Loudon Clachan; David Rankine Kennedy, all of Manningtree, England |
| [21] | Appl. No. | 751,372 |
| [22] | Filed | Aug. 9, 1968 |
| [45] | Patented | Nov. 16, 1971 |
| [73] | Assignee | Bexford Limited<br>Manningtree, Essex, England |
| [32] | Priority | Aug. 24, 1967 |
| [33] | | Great Britain |
| [31] | | 39,112/67 |

[54] FILM MATERIAL FOR LITHOGRAPHIC PLATES
11 Claims, No Drawings

[52] U.S. Cl. .................................................... 117/76,
117/47, 117/56, 96/87
[51] Int. Cl. .................................................... B41m 1/18,
G03c 1/78
[50] Field of Search ........................................... 96/87;
117/47 R, 76, 56

[56] References Cited
UNITED STATES PATENTS

| | | | |
|---|---|---|---|
| 3,370,951 | 2/1968 | Hasenauer et al. ........... | 96/87 |
| 2,943,937 | 7/1960 | Nadeau et al. ................ | 96/87 |
| 3,022,192 | 2/1962 | Brandt .......................... | 117/47 R |
| 3,201,251 | 8/1965 | Nadeau et al. ................ | 96/87 |

Primary Examiner—Norman G. Torchin
Assistant Examiner—Edward C. Kimlin
Attorney—Cushman, Darby & Cushman ABSTRACT: A film material for use in production of a lithographic printing plate comprises a polyester film material which has been pretreated with a halogen-containing phenolic substance or chloro-substituted aliphatic acid and treated at 30° C. or above, coated with a polymer interlayer and overcoated with an insoluble hydrophilic layer containing a filler. The outer layer of the product may carry a positive or negative-working light-sensitive layer.

FILM MATERIAL FOR LITHOGRAPHIC PLATES

This invention relates to synthetic film material. In application Ser. No. 511,352 now abandoned there is described a process for the production of a translucent polyester film material which is receptive to clear and legible marking with pencil or ink which comprises treating a film of synthetic linear polyester on at least one surface with a solution or dispersion in a volatile medium of one or more halogen containing phenolic substances, at a temperature of at least 30° C., and then coating on the treated surface, an adherent layer or layers of organic film-forming material, the single layer, or outermost layer where more than one is applied, containing finely divided discrete particles of a translucence-producing toothing agent or agents.

The term "halogen-containing phenolic substance" is intended to comprise chemical compounds whose molecules contain at least one benzenoid ring or fused benzenoid ring and one or more hydroxyl groups and one or more halogen atoms which are attached directly to carbon atoms belonging to a benzenoid or fused benzenoid ring or rings. The following are examples of such halogen-containing phenolic substances—ortho-chlorophenol; para-chlorophenol; 2,4-dichlorophenol; 2,4,5-trichlorophenol; 2,4,6-trichlorophenol; 2,3,4,6-tetrachlorophenol; pentachlorophenol; 2,4-dichloro-5-methyl phenol; 2,4-dichloro-3,5-dimethyl phenol; 4-chloro-2-phenyl phenol; 2-benzyl-4-chlorophenol; 2,2'-dichloro-4,4'diphenol; 2,2'-methylene bis(4-chlorophenol); 4-chloro-1-naphthol; 3,5-dichloro-salicyclic acid; 2,4-dibromophenol; 2,4,6-tribromophenol; isopropylene di(2,5-dichlorophenol).

The film of synthetic linear polyester is preferably a film formed from polyethylene terephthalate and it is preferably one which has been molecularly oriented by stretching in one or two directions at right angles. Such synthetic linear polyester film materials are readily available commercially.

The treatment may conveniently consist in applying to the synthetic linear polyester film surface a solution of any one of several of the exemplified halogen-containing phenolic substances in suitable volatile media such as those containing lower ketones, lower alcohols or chlorinated hydrocarbons, or dilute solutions of volatile bases such as dilute ammonia, by using any of several well-known coating procedures, such as dip or bead application, and then heating the film for a short time at an elevated temperature to remove the volatile solvent and allow the halogen-containing phenolic substance to swell the film surface to some extent.

The presence of an intermediate layer between the treated surface of the polyester and the organic film-forming layer, is also described and a large number of examples of such interlayers are set forth in application Ser. No. 511,352. Application Ser. No. 511,352 further indicates that the preferred toothing agent is silica but that other toothing agents, such as zinc oxide or titanium dioxide may additionally be present.

According to the present invention, there is provided a film material adapted to be converted to a lithographic printing plate which comprises a support base of polyester film material, at least one surface of which has been treated with a solution or dispersion in a volatile medium of at least one substance selected from halogen-containing phenolic substances and chloro-substituted aliphatic acids, at a temperature of at least 30° C., there being adherent to the surface so treated an interlayer selected from:

a. vinyl chloride-vinyl acetate copolymers and partially hydrolyzed vinyl chloride-vinyl acetate copolymers;
or b. vinylidene chloride-acrylonitrile copolymers and copolymers of vinylidene chloride with acrylic and methacrylic esters;
or c. polyvinyl halogeno-acetates and copolymers of vinyl halogeno-acetates;
or d. phenol formaldehyde, urea formaldehyde and melamine formaldehyde resins;
or e. cellulose nitrate and cellulose acetate butyrate;
or f. polymers of acrylic and methacrylic acids and esters, and copolymers of these acids and esters with other vinyl unsaturated monomers;

and there being superimposed on the said interlayer a hydrophilic layer which comprises a water-swellable organic film-forming material which has been insolubilized and which contains at least one finely divided inorganic filler.

The preferred polyester film base material is polyethylene terephthalate which has been biaxially oriented.

The halogen-containing phenolic substances may be any one or more of these hereinbefore exemplified. Further examples which may be used are: 3-methyl-4-chlorophenol, parachloro ortho benzyl phenol and 4-chlororesorcinol. The chloro-substituted aliphatic acid is preferably trichloracetic acid.

It is generally preferred to treat the synthetic linear polyester film base by coating it with a solution of 2,4,6-trichlorophenol, 2,4,5-trichlorophenol, 2,4-dichlorophenol or 3-methyl-4-chlorophenol, or a binary mixture of these substances in a suitable volatile solvent, these substances or binary mixtures constituting 0.5–20 percent by weight of the treating solution, and then heating the film for 1–15 min. at 30°–120bL C.

The interlayer may be applied from solution or dispersion in a volatile medium to the polyester film after it has been treated with halogen-containing phenolic substances or chloro-substituted aliphatic acid or, alternatively, it may be applied in combination with the halogen-containing substances or chloro-substituted aliphatic acid from the same solution or dispersion.

Suitable water-swellable organic film-forming materials for use in the invention are:
Cellulose ethers, e.g. methyl cellulose, ethyl cellulose, hydroxymethyl cellulose, hydroxy propyl ethyl cellulose carboxy methyl cellulose;
Polyacrylamides;
Polyvinyl pyrrolidone;
Sodium alginate;
Natural gums such as gum arabic;
Polyvinyl alcohols;
Carbohydrates e.g. starch and dextrine;
Proteins, e.g. casein and zein;
Vinyl/maleic anhydride copolymers;
Ethylene oxide polymers;

The materials may be insolubilized in some cases by the application of heat or by the inclusion of a suitable cross-linking agent in the layer. Examples of such cross-linking agents are;
Urea formaldehyde; melamine formaldehyde; glyoxal and dialdehydes generally; formaldehyde; dibasic acids, e.g. oxalic acid, maleic acid, tartaric acid and fumaric acid; hydrochloric acid; phosphoric acid; aluminum sulfate ferrous sulfate; copper sulfate; chromium salts, e.g. ammonium dichromate and chromic acid; borax; organic titanates; and epoxy resins.

The preferred hydrophilic water-swellable material is polyvinyl acetate which has been hydrolyzed to an extent of 84–98 percent.

The preferred cross-linking agent for polyvinyl alcohol is a methylated melamine formaldehyde resin, 5–200 percent by weight of the polyvinyl alcohol being used. A particularly suitable commercially available methylated melamine formaldehyde resin is marketed by B.I.P. Chemicals Limited and sold under the description "B.T.309."

Various catalysts may be employed, in small amounts, to accelerate the curing time required for the cross-linking agent to react with the polyvinyl alcohol. Such catalysts include magnesium chloride, zinc chloride, alum, ammonium chloride, ammonium sulfate, salts of divalent and trivalent metals and acids, e.g. hydrochloric acid and acetic acid.

Suitable finely divided fillers for use in the invention are naturally occurring silicates, e.g. clay, kaolin, talc, bentonite, sepiolite and mica; oxides, e.g. titanium dioxide, zinc oxide, colloidal silica, diatomaceous silica; carbonates, e.g. calcium carbonate, magnesium carbonate, barium carbonate and sulfates, e.g. barium sulfate and calcium sulfate.

It is preferred that the filler is incorporated into the hydrophilic layer, for example by sand milling, ball milling or vibro energy milling, in such a way that the size of the fillers is reduced to less than 1 micron and preferably less than 100 millimicrons.

The preferred fillers are silica, clay and titanium dioxide. The preferred size range of these fillers is form 10–100 millimicrons. It is preferred that the ratio of filler/organic film-forming material in the layer is from 0.5 to 10 of filler to 1 of organic film-forming material. It is preferred that both silica and clay are present and most preferably that more clay than silica is present in the layer. When titanium dioxide is used as the filler the hydrophilic layer assumes a very white appearance. This helps to increase the contrast of the image and nonimage areas after the plate has been imaged. When a transparent plate is required titanium dioxide cannot be used as a filler: in that case silica is the preferred filler.

The film material of the present invention can be used as a direct image lithographic printing plate, i.e. an image may be directly inscribed on the plate using an oleophilic medium. An example of this is the typing of an image on a plate using a typewriter ribbon impregnated with a fatty based ink. Alternatively the image may be transferred onto the plate using a colloid transfer process such as the Ektalith process or an electrophotographic process such as the Xeroxography process, or a thermographic process. By colloid transfer process is meant the transfer of an emulsion image of the type described in BP 655,274 to the film material of the present invention. The transferred emulsion is oleophilic and after either heat treatment or treatment with an alkali, the plate may be inked up in the usual manner and is then ready for use as a litho plate.

By Xeroxography is meant the use of an enlarged photoconductive selenium plate, which after exposure to the original has the image developed by cascading the plate with a thermoplastic powder. This resin image is transferred to the film material of the present invention, heat fused and is then ready for inking up and use as a litho plate.

In another embodiment of the invention the film material may be provided with a coating of a positive or a negative working light-sensitive material, thus becoming a so-called presensitized lithographic plate.

By negative working light-sensitive material is meant a material which can be coated onto the base and which is sensitive to actinic light and which, when exposed to actinic light through a negative, suffers in the exposed areas a chemical reaction which renders the exposed areas insoluble and hydrophobic. The layer is developed by dissolving the unexposed unchanged areas, thus leaving the insoluble areas which on inking up the plate form a positive image of the original; the underlying hydrophilic base, which is thus revealed, does not accept the ink. The insoluble areas are oleophilic either due to the fact that the coated material is oleophilic or because on exposure to light the material becomes oleophilic. A large number of such photosensitive materials have been proposed and used. Exemplary of such materials are:

a. Light sensitive polymers such as polyvinyl cinnamate, polyvinyl phosphonic mono esters of chalcones, styrene/maleic anhydride copolymers containing a cinnamoyl or chalcone group, vinyl polymers containing an azide group.
b. Polymers together with a light-sensitive compound which hardens the polymers when exposed to light, such as gelatin and bi-chromate, gelatin and diazo compounds, polyacrylate and diazo compounds, vinyl polymers and p-hydroxy benzal acetophenone, styrene/maleic anhydride copolymers and diazo fluoborate.
c. Photopolymerizable mixtures such as acrylamide +NN'-methylene-bis-acrylamide plus a catalyst.
d. Polymeric diazonium compounds such as the condensate of 4-diazo diphenylamine and formaldehyde.
e. Light-sensitive compounds which can be coated directly onto the support base without any hardenable polymers such as diazo compounds, diazostilbenes, naphthoquinonediazides, methylene fluorene sulfonic acid and cinnamoyl furfurylidene. These latter compounds are usually coated onto the support together with a nonhardenable resin such as a novalak resin to prevent them crystallizing on the support.

A convenient example of a negative working light-sensitive layer for use in the present invention is X4-diazo diphenylamine formaldehyde resin.

By positive working light-sensitive material is meant a material which can be coated onto the film material of this invention, which is sensitive to actinic light and which when exposed to actinic light through a positive and developed, yields in the nonexposed areas an insoluble oleophilic positive image.

An example of such a positive working material is a high molecular weight ester of a diazo-oxide sulphonic-acid which is insoluble in water and light-sensitive. On exposure to light, phenolic groups are produced which make the coating soluble in dilute aqueous alkali. After exposure, the exposed areas are dissolved away with an alkaline developer leaving the original ester as an oleophilic image which may be inked up in the usual manner.

When the film material of the present invention is used either as a direct image plate or as the basis for a presensitized lithographic plate, the insolubilized, water-swellable, organic film-forming polymeric material plus fillers provide the hydrophilic background and the silica and other inorganic fillers if they are present form a toothed surface to which either the directly inscribed or transferred oleophilic image or the negative or positive working light-sensitive materials are able to strongly adhere. The "tooth" also provides a reservoir for ink in the image areas and water in the nonimage areas thus facilitating the successful working of the plate.

The following examples will serve to illustrate the invention.

EXAMPLE 1

Biaxially oriented polyethylene terephthalate film base was coated as follows:

| Coat 1 | A dilute solution as follows: | |
|---|---|---|
| | 2,4-dichlorophenol | 2.5 g. |
| | 2,4,6-trichlorophenol | 2.5 g. |
| | Methanol | 100 ml. |
| | dried for 90 sec. at 80° C. | |
| Coat 2 | A dilute solution as follows: | |
| | Vinylite VAGH | 2.0 g. |
| | Carbon tetrachloride | 80 ml. |
| | Acetone | 20 ml. |
| | Ethyl lactate | 8 ml. |
| | dried for 5 min. at 100° C. | |
| Coat 3 | A hydrophilic lacquer as follows: | |
| | Aerosil TK800 (silicon dioxide | 13.8 g. |
| | Surfil B (china clay) | 27.6 |
| | Tioxide RCR3 (titanium dioxide) | 26.2 g. |
| | Polyvinyl alcohol | 11.0 g. |
| | Melamine formaldehyde | 15.5 g. |
| | Magnesium chloride hexahydrate | 2.9 g. |
| | Tergitol NP 35 (nonionic wetting agent) | 0.1 g. |
| | Water | 350 ml. |

The above lacquer was sand milled for 10 min. and then enough acetic acid was added to bring the pH to within the range 4–5.

After coating this lacquer was then dried for 10 min. at 110° C.

The thus produced plate was then placed in a typewriter and a word image was typed on it using a fatty based ink. This plate was then placed in an offset printing press and 100 clear copies of the original were produced. No sign of image breakdown was apparent on the plate after use.

EXAMPLE 2

The plate of example 1 after coat 3 had been dried was sensitized by coating it with the following solution:

| | |
|---|---|
| ZAL (a diazonium diphenylamine/ formaldehyde resin) | 0.8 g. |
| Water | 30 ml. |
| Methanol | 70 ml. |

The thus sensitized plate was then dried for 5 min. at 70° C. After drying it was exposed to actinic light through a photographic negative. The plate was then developed and placed in an offset lithographic press. One thousand good positive copies of the original of the photographic negative were produced. No sign of image breakdown was apparent on the plate after use.

EXAMPLE 3

Polyester film base was coated as follows:

| Coat 1 | Vinylite VAGH | 0.75 g. |
|---|---|---|
| | Acetone | 94 ml. |
| | 2,4,6-trichlorophenol | 2.5 g. |
| | 2,4-dichlorophenol | 2.5 g. |
| | Methanol | 5.0 ml. |
| | Lytron | 0.215 g. |
| | dried for 5 min. at 100° C. | |
| Coat 2 | | |

Lacquer coating as (coat 3) in example 1.

It can be seen that coat 1 in this example is an example of combining the chlorophenol treatment (coat 1), plus interlayer resin (coat 2), of example 1.

EXAMPLE 4

Polyester film base was coated as follows:

| Coat 1 | 3-Methyl-4-chlorophenol | 5.0 g. |
|---|---|---|
| | Methanol | 100 ml. |
| | dried for 2 min. at 70° C. | |
| Coat 2 | A copolymer containing: | |
| | 70 mole % vinyl monochloroacetate | |
| | 29 mole % vinyl alcohol | |
| | 1 mole % vinyl acetate | 1.0 g. |
| | Acetone | 100 ml. |
| | Dried for 1 min. at 80° C. | |
| Coat 3 | Lacquer coating as in example 1. | |

EXAMPLE 5

| Coat 1 | Trichloroacetic acid | 5 g. |
|---|---|---|
| | Acetone | 100 ml. |
| | Saran F 220 (a vinylidene chloride acrylonitrile copolymer) | 2 g. |
| | Dried for 5 min. at 90° C. | |
| | This again is an example of combining coat 1 and 2. | |
| Coat 2 | Elvanol 50/42 | 12 g. |
| | Aerosil TK800 | 15 g. |
| | Surfil B | 30 g. |
| | Tioxide RCR3 | 28.3 g. |
| | Melamine formaldehyde resin | 12.5 g. |
| | Magnesium chloride hexahydrate | 2.2 g. |
| | Methanol | 179 ml. |
| | Water | 179 ml. |

The above lacquer was sand milled for 10 min. and then enough hydrochloric acid was added to bring the pH within the range 4–5. After coating this lacquer was then dried for 10 min. at 110° C.

EXAMPLE 6

Polyester film base was coated as follows:

| Coat 1 | 2,4-dichlorophenol | 5 g. |
|---|---|---|
| | 2,4,6-trichlorophenol | 5 g. |
| | X Saran F220 | 2 g. |
| | Acetone | 100 ml. |
| | Dried for 5 min. at 105° C. | |
| Coat 2 | Elvanol 72/51 | 8 g. |
| | Aerosil TK800 | 19 g. |
| | Surfil B | 38 g. |
| | Tioxide RCR3 | 25 g. |
| | BT309 (melamine formaldehyde resin) | 10 g. |
| | Magnesium chloride hexahydrate | 1.8 g. |
| | Methanol | 110 ml. |
| | Water | 135 ml. |

The above lacquer was sand milled for 10 min. and then enough hydrochloric acid was added to bring the pH within the range 4–5. After coating this lacquer was then dried for 10 min. at 110° C.

EXAMPLE 7

Polyester film base was coated with coats 1 and 2 as in example 1.

| Coat 3 | The following lacquer was applied: | |
|---|---|---|
| | Klucel E (hydroxyl propyl ethyl cellulose) | 23.2 g. |
| | Surfil B | 43.5 g. |
| | Aerosil TK800 | 21.7 g. |
| | Tioxide RCR3 | 5.8 g. |
| | Toluene sulfonic acid | 0.36 g. |
| | Epok U 9190 (urea formaldehyde) | 5.8 g. |
| | Acetone | 300 ml. |

The lacquer was coated and dried for 10 min. at 120° C.

EXAMPLE 8

Biaxially oriented polyester film was coated with coats 1 and 2 as in example 1.

| Coat 3 | the following lacquer was applied. | |
|---|---|---|
| | Elvanol 72/51 | 8 g. |
| | Aerosil TK800 | 25 g. |
| | Melamine formaldehyde resin | 8 g. |
| | Magnesium chloride hexahydrate | 1.4 g. |
| | Methanol | 119 ml. |
| | Water | 156 ml. |

The above lacquer was sand-milled for 2 minutes and then enough hydrochloric acid was added to bring the pH within the range 4–5. After coating the lacquer was then dried for 10 minutes at 120° C.

The plates produced in examples 3 to 8 may either be used as direct image litho plates or they may be sensitized as in example 2 and used as a presensitized litho plate, or as plates to be imaged by the Ektalith or Xeroxography processes.

In the above examples the following Trade Names have been used.

TRADE NAMES

| Name | Description | Manufacturer |
|---|---|---|
| Aerosil TK800 | Silicon dioxide | Degussa. |
| BT309 | Methylated melamine formaldehyde | B.I.P. Chemicals Ltd. |
| Ektalith | Gelatine transfer process | Kodak Ltd. |
| Elvanol | Polyvinyl alcohol | DuPont Co. Ltd. |
| Epok U9190 | Melamine formaldehyde | British Resin Products. |
| Klucel E | Hydroxy propyl ethyl cellulose | Hercules Powder Co. |
| Lytron | Ethylene oxide polymer | Union Carbide Chemicals Dept. |
| Saran F220 | Vinylidene chloride/acrylonitrile copolymer | Dow Chemical Co. Ltd. |
| Surfil B | China clay | Scott Bader & Co. Ltd. |
| Tergitol NP35 | Non-ionic wetting agent | Union Carbide Ltd. |
| Tioxide RCR3 | Rutile titanium dioxide | British Titan Products Co. Ltd. |
| Vinylite VAGH | Partially hydrolysed vinyl chloride/vinyl acetate copolymer | Bakelite Ltd. |
| ZAL | Diazonium diphenylamine formaldehyde | Fisons Industrial Chemicals. |

We claim as our invention:

1. A process for the production of a film material adapted to be converted to a lithographic printing plate which comprises treating one surface of a support base of polyester film material with a solution of a substance selected from the group consisting of 2,4,6-trichlorophenol, 2,4,5-trichlorophenol, 2,4-dichlorophenol, 3-methyl-4-chlorophenol and binary mixtures thereof in a volatile solvent, said substance constituting 0.5–10 percent by weight of the treating solution, and then heating the film for 1–15 minutes at 30°–120° C., coating onto the surface so treated a polymeric film-forming material selected from the class consisting of:
   a. vinyl chloride-vinyl acetate copolymers and partially hydrolyzed vinyl chloride-vinyl acetate copolymers;
   b. vinylidene chloride-acrylonitrile copolymers and copolymers of vinylidene chloride with acrylic and methacrylic esters;
   c. Polyvinyl halogeno-acetates and copolymers of vinyl halogeno-acetates;
   d. phenol formaldehyde, urea formaldehyde and melamine formaldehyde resins;
   e. cellulose nitrate and cellulose acetate butyrate;
   f. polymers of acrylic and methacrylic acids and esters, and copolymers of these acids and esters with other vinyl unsaturated monomers;

drying the interlayer so formed and coating thereon a hydrophilic, polymeric organic film-forming material having dispersed therein at least one finely divided inorganic filler, insolubilizing said polymeric organic film-forming material and drying the layer so formed to produce a hydrophilic water-swellable layer.

2. A process for producing a film material according to claim 1 wherein the polyester film is polyethylene terephthalate film which has been biaxially oriented.

3. A process for producing a film material according to claim 1 wherein the water-swellable organic film-forming material is selected from the class consisting of cellulose ethers, carboxy methyl cellulose, polyacrylamides, polyvinyl pyrrolidone, sodium alginate, natural gums, polyvinyl alcohols, carbohydrates, proteins, vinyl/maleic anhydride copolymers and ethylene oxide polymers.

4. A process for producing a film material according to claim 1 wherein the water-swellable organic film-forming material comprises a cross-linking agent therefor.

5. A process for producing a film material according to claim 4 wherein the water-swellable organic film-forming material comprises a catalyst for the cross-linking reaction.

6. A process for producing a film material according to claim 1 wherein the water-swellable organic film-forming material is polyvinyl acetate which has been hydrolyzed to the extent of 84 to 98 percent.

7. A process for producing a film material according to claim 6 wherein the said hydrolyzed polyvinyl acetate comprises methylated melamine formaldehyde resin as a cross-linking agent therefor.

8. A process for producing a film material according to claim 1 wherein the filler is selected from the class consisting of silica, clay and titanium dioxide.

9. A process for producing a film material according to claim 1 which carries on said hydrophilic layer a layer of a positive-working light-sensitive material.

10. A process for producing a film material according to claim 1 which carries on said hydrophilic layer a layer of a negative-working light-sensitive material.

11. A film material obtained by the process of claim 1.

* * * * *